(12) United States Patent
Teragawa et al.

(10) Patent No.: US 11,180,672 B2
(45) Date of Patent: Nov. 23, 2021

(54) FINE SILVER PARTICLE DISPERSING SOLUTION

(71) Applicant: DOWA ELECTRONICS MATERIALS CO., LTD., Tokyo (JP)

(72) Inventors: Shingo Teragawa, Tokyo (JP); Takashi Hinotsu, Tokyo (JP); Taro Torigoe, Tokyo (JP); Shinichi Konno, Tokyo (JP)

(73) Assignee: DOWA ELECTRONICS MATERIALS CO., LTD., Tokyo (JP)

( * ) Notice: Subject to any disclaimer, the term of this patent is extended or adjusted under 35 U.S.C. 154(b) by 0 days.

(21) Appl. No.: 15/579,231

(22) PCT Filed: Apr. 22, 2016

(86) PCT No.: PCT/JP2016/002151
§ 371 (c)(1),
(2) Date: Dec. 4, 2017

(87) PCT Pub. No.: WO2016/194289
PCT Pub. Date: Dec. 8, 2016

(65) Prior Publication Data
US 2018/0179409 A1    Jun. 28, 2018

(30) Foreign Application Priority Data

Jun. 5, 2015 (JP) .............................. JP2015-114691
Mar. 25, 2016 (JP) .............................. JP2016-061397

(51) Int. Cl.
| | |
|---|---|
| *C09D 11/52* | (2014.01) |
| *H01B 1/00* | (2006.01) |
| *H01B 1/22* | (2006.01) |
| *B22F 1/00* | (2006.01) |
| *H01B 1/02* | (2006.01) |
| *B22F 1/02* | (2006.01) |
| *B22F 9/24* | (2006.01) |

(52) U.S. Cl.
CPC ............ *C09D 11/52* (2013.01); *B22F 1/0022* (2013.01); *B22F 1/0062* (2013.01); *H01B 1/02* (2013.01); *H01B 1/22* (2013.01); *B22F 1/02* (2013.01); *B22F 9/24* (2013.01); *B22F 2301/255* (2013.01); *B22F 2304/056* (2013.01)

(58) Field of Classification Search
None
See application file for complete search history.

(56) References Cited

U.S. PATENT DOCUMENTS

| | | | | |
|---|---|---|---|---|
| 5,397,823 A | * | 3/1995 | Torikoshi | ............... C08K 5/057 106/243 |
| 2005/0032930 A1 | * | 2/2005 | Jackson | ................. C09D 11/40 523/160 |
| 2013/0029034 A1 | * | 1/2013 | Liu | ........................... B22F 9/24 427/125 |
| 2013/0153835 A1 | | 6/2013 | Hinotsu et al. | |
| 2015/0259556 A1 | * | 9/2015 | Chopra | ................ C09D 11/106 427/125 |
| 2016/0101486 A1 | * | 4/2016 | Endoh | ................... B22F 1/0022 228/115 |
| 2019/0128784 A1 | * | 5/2019 | Gupta | ....................... G01N 1/36 |

FOREIGN PATENT DOCUMENTS

| | | |
|---|---|---|
| EP | 2875883 A1 | 5/2015 |
| EP | 2946856 A1 | 11/2015 |
| JP | 2009138242 A | 6/2009 |
| JP | 2014214357 A | 11/2014 |
| JP | 2015206108 A | 11/2015 |
| WO | 2005003245 A1 | 1/2005 |
| WO | WO 2015151941 | * 10/2015 |

OTHER PUBLICATIONS

International search report for patent application No. PCT/JP2016/002151 dated Jul. 19, 2016.
European search report for patent application No. 16 80 2736 dated Dec. 18, 2018.

* cited by examiner

*Primary Examiner* — Tanisha Diggs
(74) *Attorney, Agent, or Firm* — Bachman and Lapointe PC; George Coury

(57) ABSTRACT

There is produced a fine silver particle dispersing solution which contains: fine silver particles (the content of silver in the fine silver particle dispersing solution being 30 to 95% by weight), which have an average primary particle diameter of greater than 100 nm and not greater than 300 nm and which are coated with an amine having a carbon number of 8 to 12, such as octylamine, serving as an organic protective material; a polar solvent (5 to 70% by weight) having a boiling point of 150 to 300° C.; and an acrylic dispersing agent (5% by weight or less with respect to the fine silver particles), such as a dispersing agent of at least one of acrylic acid ester and methacrylic acid ester.

8 Claims, No Drawings

FINE SILVER PARTICLE DISPERSING SOLUTION

TECHNICAL FIELD

The present invention relates generally to a fine silver particle dispersing solution. More specifically, the invention relates to a fine silver particle dispersing solution used for forming fine electrodes and circuits of electronic parts and so forth.

BACKGROUND ART

In order to form fine electrodes and circuits of electronic parts and so forth, it is known that a conductive ink containing fine silver particles (silver nanoparticles) having particle diameters of a few nanometers to tens nanometers dispersed in a dispersing medium, or a conductive paste made into a paste after mixing silver nanoparticles with a binder resin and a solvent, is applied on a substrate, and then, heated at a low temperature of about 100 to 200° C. to be burned to sinter the fine silver particles with each other to form a silver conductive film.

Such fine silver particles for use in conductive inks and conductive pastes have a very high activity and are easy to proceed the sintering thereof even at a low temperature, so that they are unstable particles as they are. For that reason, in order to prevent the sintering and aggregation of fine silver particles with each other to ensure the independence and preservation stability of the fine silver particles, it is known that fine silver particles coated with an organic protective material of an organic compound are dispersed in a dispersing medium to be preserved as a fine silver particle dispersing solution.

As fine silver particles which are coated with an organic protective material and which can be used for such a fine silver particle dispersing solution, there are proposed silver particles which have an average particle diameter of 3 to 20 nm and which are coated with an organic protective material of a primary amine having a carbon number of 6 to 12 (see, e.g., Patent Document 1).

PRIOR ART DOCUMENT(S)

Patent Document(s)

Patent Document 1: Japanese Patent Laid-Open No. 2009-138242 (Paragraph Numbers 0011-0012)

SUMMARY OF THE INVENTION

Problem to be Solved by the Invention

However, the fine silver particles coated with an organic protective material, such as a primary amine, as proposed in Patent Document 1, are hydrophobic, so that they are aggregated in a polar solvent to have a bad dispersion therein. For that reason, the viscosity of a fine silver particle dispersing solution containing such fine silver particles dispersed in a polar solvent is increased, so that it is difficult to form fine electrodes, circuits and so forth. On the other hand, the fine silver particles coated with such an organic protective material have a good dispersibility in a nonpolar solvent. However, if the fine silver particle dispersing solution containing the fine silver particles dispersed in a nonpolar solvent, together with a resin binder, is used for producing a conductive paste, there is a problem in that the nonpolar solvent generally has a bad compatibility with the resin binder, so that it is not possible to dissolve the resin binder therein.

It is therefore an object of the present invention to eliminate the aforementioned problems and to provide a fine silver particle dispersing solution which has a good dispersibility of fine silver particles even if a polar solvent is used, the fine silver particle dispersing solution being capable of being burned at a low temperature and capable of producing a silver conductive film having a low resistance.

Means for Solving the Problem

In order to accomplish the aforementioned and other objects, the inventors have diligently studied and found that it is possible to produce a fine silver particle dispersing solution which has a good dispersibility of fine silver particles even if a polar solvent is used, the fine silver particle dispersing solution being capable of being burned at a low temperature and capable of producing a silver conductive film having a low resistance, if fine silver particles which are coated with an amine having a carbon number of 8 to 12 as an organic protective material and which have an average primary particle diameter of greater than 100 nm and not greater than 300 nm, together with an acrylic dispersing agent, the amount of which is 5% by weight or less with respect to that of the fine silver particles, are added to a polar solvent having a boiling point of 150 to 300° C. Thus, the inventors have made the present invention.

According to the present invention, there is provided a fine silver particle dispersing solution comprising: a polar solvent having a boiling point of 150 to 300° C.; fine silver particles which are coated with an amine having a carbon number of 8 to 12 as an organic protective material and which have an average primary particle diameter of greater than 100 nm and not greater than 300 nm, the fine silver particles being added to the polar solvent; and an acrylic dispersing agent added to the polar solvent, the content of the acrylic dispersing agent being 5% by weight or less with respect to that of the fine silver particles.

In this fine silver particle dispersing solution, the amine is preferably octylamine. The polar solvent having the boiling point of 150 to 300° C. is preferably a glycol ether solvent or terpineol. The glycol ether solvent is preferably diethylene glycol monobutyl ether, diethylene glycol dibutyl ether or diethylene glycol monobutyl ether acetate. The acrylic dispersing agent is preferably a dispersing agent of at least one of acrylic acid ester and methacrylic acid ester. The acrylic dispersing agent is more preferably a dispersing agent of methacrylic acid butyl ester. The content of silver in the fine silver particle dispersing solution is preferably 30 to 95% by weight. The content of the polar solvent in the fine silver particle dispersing solution is preferably 5 to 70% by weight.

Effects of the Invention

According to the present invention, it is possible to provide a fine silver particle dispersing solution which has a good dispersibility of fine silver particles even if a polar solvent is used, the fine silver particle dispersing solution being capable of being burned at a low temperature and capable of producing a silver conductive film having a low resistance.

MODE FOR CARRYING OUT THE INVENTION

In a preferred embodiment of a fine silver particle dispersing solution according to the present invention, fine silver particles which are coated with an amine having a carbon number of 8 to 12 as an organic protective material and which have an average primary particle diameter of greater than 100 nm and not greater than 300 nm, together with an acrylic dispersing agent, the amount of which is 5% by weight or less with respect to that of the fine silver particles, are added to a polar solvent having a boiling point of 150 to 300° C., preferably 200 to 260° C.

As the amine having the carbon number of 8 to 12, there can be used octylamine, nonylamine, decylamine, dodecylamine or the like, and there is preferably used octylamine. By coating fine silver particles with such a primary amine, it is possible to prevent the sintering of the fine silver particles with each other to suitably hold the distance between the adjacent two of the fine silver particles. If the carbon number of the primary amine is greater than 12, it is required to provide a high thermal energy during the thermal decomposition thereof. On the other hand, if the carbon number is less than 8, the function of coating the fine silver particles is weakened, and it is difficult to disperse the fine silver particles, so that the fine silver particles easily form aggregated particles and the temporal stability thereof is deteriorated.

The average primary particle diameter of the fine silver particles is greater than 100 nm and not greater than 300 nm, preferably in the range of from 110 nm to 200 nm, and more preferably in the range of from 110 nm to 150 nm. If the average primary particle diameter is greater than 300 nm, it is difficult to obtain the low-temperature sinterability expected as the fine silver particles.

As the polar solvent having the boiling point of 150 to 300° C., there is preferably used a glycol ether solvent having an ether group or terpineol. As the glycol ether solvent, there is preferably used diethylene glycol monobutyl ether, diethylene glycol dibutyl ether or diethylene glycol monobutyl ether acetate. Furthermore, the polar solvent preferably has a solubility parameter (SP value) of 8.0 to 12.0, and more preferably has a solubility parameter of 8.5 to 11.5.

The amount of the acrylic dispersing agent to be added is in the range of 5% by weight or less, preferably from 0.1% to 3.0% by weight, and more preferably 0.2 to 2.5% by weight, with respect to that of the fine silver particles. If the amount of the acrylic dispersing agent in the fine silver particle dispersing solution exceeds 5% by weight, there is some possibility that the specific resistance value of a silver conductive film formed by using the fine silver particle dispersing solution may be increased. The acrylic dispersing agent is preferably a dispersing agent of at least one of acrylic acid ester and methacrylic acid ester.

As the dispersing agent of methacrylic acid ester, there is preferably used a dispersing agent which has a framework of methacrylic acid butyl ester expressed by the following formula [I], which has a low molecular weight of not greater than about tens of thousands and which contains a compound having no functional groups. If the framework has a carboxyl group, it is replaced with the amine on the surface of the fine silver particles, so that the sinterability is deteriorated. If the weight-average molecular weight of the dispersing agent exceeds about tens of thousands, the viscosity thereof is too high. Therefore, the dispersing agent preferably has a low molecular weight of not greater than about tens of thousands, more preferably has a low molecular weight of not greater than 40,000, and most preferably has a low molecular weight of not greater than 25,000. As such a dispersing agent having the framework of methacrylic acid butyl ester, there can be used any one of M1400 (48.5% by weight of methacrylic acid butyl ester as a solid content in a solvent of diethylene glycol monobutyl ether, weight-average molecular weight of 20,000), M1200 (43% by weight of methacrylic acid butyl ester as a solid content in a solvent of diethylene glycol monobutyl ether acetate, weight-average molecular weight of 20,000) and M1000 (43% by weight of methacrylic acid butyl ester as a solid content in a solvent of terpineol, weight-average molecular weight of 20,000), which are produced by Sekisui Chemical Co., Ltd., or the like.

[Chemical Formula 1]

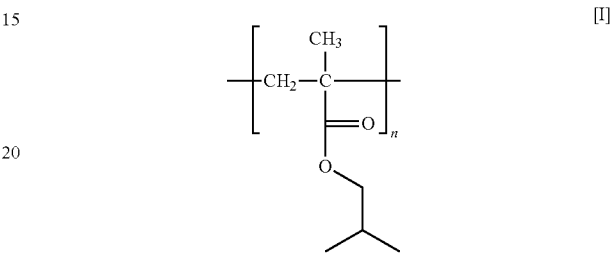

The content of silver in the fine silver particle dispersing solution is preferably 30 to 95% by weight, and more preferably 70 to 95% by weight. The content of the polar solvent in the fine silver particle dispersing solution is preferably 5 to 70% by weight, and more preferably 7 to 15% by weight.

The coating amount of the organic protective material with respect to silver in the fine silver particles is preferably 0.1 to 1% by weight, and more preferably 0.15 to 0.8% by weight.

The preferred embodiment of a fine silver particle dispersing solution according to the present invention can be produced by a method comprising the steps of: carrying out the reduction treatment of a silver compound in the presence of an amine having a carbon number of 8 to 12 serving as an organic protective material in water to obtain a water slurry containing fine silver particles coated with the organic protective material; causing the precipitation of the fine silver particles by decantation to remove a supernatant; adding the obtained wet fine silver particles, together with an acrylic dispersing agent, to a polar solvent having a boiling point of 150 to 300° C.; and drying the fine silver particles and acrylic dispersing agent, which are added to the polar solvent, at a temperature of room temperature to 100° C., preferably at a temperature of not higher than 80° C., in an atmosphere of nitrogen for 12 hours or more to remove the moisture content therein. Furthermore, since the fine silver particles are sintered with each other if the drying temperature is too high, such a high temperature is not preferable.

The organic protective material is preferably added so that the molar ratio thereof to silver of the silver compound is in the range of from 0.05 to 6.

The reduction treatment is preferably carried out at a temperature of lower than 60° C., and more preferably carried out at a temperature of 10 to 50° C. When the temperature is not lower than 60° C., the fine silver particles are easily aggregated to be fusion-bonded to each other so as not to be protected with the organic protective material, so that it is not preferable that the temperature is not lower than 60° C. The reaction time in the reduction treatment is preferably not longer than 30 minutes, and more preferably not longer than 10 minutes. Since the pH during reaction in the reduction treatment has a great influence on the reduction reaction, the pH during reaction is preferably adjusted to be 4.0 to 12.0. As a pH regulator for adjusting the pH thereof, there may be used NaOH, $NH_3$, $HNO_3$ or the like.

The reducing agent may be any one of various reducing agents capable of reducing silver. However, if the reducing agent is an acidic reducing agent having a carbonyl group, a part of the acidic reducing agent reacts with the organic protective material to amide-bond thereto, although it is possible to obtain fine silver particles. Therefore, the reducing agent is preferably a basic reducing agent, and more preferably hydrazine or $NaBH_4$. The reducing agent is preferably added so that the molar ratio thereof to silver of the silver compound is in the range of from 0.1 to 2.0.

The silver compound is preferably a silver salt or a silver oxide, and more preferably silver nitrate. The silver compound is added so that the concentration of silver ions in the aqueous reaction solution is preferably in the range of from 0.01 mol/L to 1.0 mol/L, and more preferably in the range of from 0.03 mol/L to 0.2 mol/L.

If the obtained fine silver particle dispersing solution is kneaded and degassed by a three-roll mill, a bead mill, a wet jet mill, an ultrasonic homogenizer or the like to prepare a fine silver particle kneaded mixture which is applied on a substrate and heated at a low temperature of about 100 to 200° C. to be burned, the fine silver particles can be sintered with each other to form a silver conductive film.

The average primary particle diameter of the fine silver particles can be calculated by an image analysis software (A-image-kun (registered trademark) produced by Asahi Kasei Engineering Corporation) with respect to optionally selected 100 or more of the fine silver particles on a scanning electron micrograph (SEM image) obtained by observing the fine silver particles by means of a scanning electron microscope (SEM) (S-4700 produced by Hitachi Hi-Technologies Corporation) at a magnification of 50,000.

The average secondary particle diameter of the fine silver particles can be measured by means of a dynamic light scattering particle size analyzer (Nanotrac Wave-EX150 produced by Nikkiso Co., Ltd.) after a fine silver particle kneaded mixture, which is prepared by kneading and defoaming a fine silver particle dispersing solution caused to pass through a three-roll mill, is diluted 10,000 times with butyl carbitol to be dispersed for one minute by means of an ultrasonic disperser.

The ratio ($D_{50}/D_{SEM}$) of the average secondary particle diameter ($D_{50}$) to average primary particle diameter ($D_{SEM}$) of the fine silver particles denotes a degree of dispersion of the fine silver particles. If the ratio $D_{50}/D_{SEM}$ is closer to 1, the dispersibility of the fine silver particles is more excellent. The ratio $D_{50}/D_{SEM}$ is preferably in the range of from 1.0 to 1.5, and more preferably in the range of from 1.0 to 1.3.

EXAMPLES

Examples of a fine silver particle dispersing solution according to the present invention will be described below in detail.

Example 1

After pure water 3422.0 g serving as a reaction medium was put in a 5 L of reaction vessel to adjust the temperature thereof at 40° C., octylamine (special grade produced by Wako Pure Chemical Industries, Ltd., molecular weight 129.24, carbon number=8) 63.9 g serving as an organic protective material (the molar ratio of the organic protective material to Ag (number of moles of octylamine/number of moles of silver)=2.5), and hydrazine hydrate (80% solution produced by Otsuka Chemical Co., Ltd.) 12.4 g serving as a reducing agent (the molar ratio of the reducing agent to Ag (number of moles of hydrazine hydrate/number of moles of silver)=1) were added thereto. The solution thus obtained was stirred by rotating a stirring rod having impellers at 345 rpm by means of an outside motor in the atmosphere. Then, after an aqueous solution prepared by dissolving silver nitrate crystal (produced by Toyo Kagaku Inc.) 33.6 g serving as a silver compound and 25% by weight of ammonia water (industrial ammonia water produced by Takasugi Pharmaceutical Co., Ltd.) 61.8 g in pure water 180.0 g was added thereto at a stroke, the solution was stirred for 2 minutes to obtain a water slurry containing fine silver particles coated with octylamine serving as the organic protective material.

The fine silver particles in the water slurry thus obtained were observed at a magnification of 50,000 by means of a scanning electron microscope (SEM) (S-4700 produced by Hitachi Hi-Technologies Corporation), and the average primary particle diameter of the fine silver particles was calculated by the image analysis software (A-image-kun (registered trademark) produced by Asahi Kasei Engineering Corporation) with respect to optionally selected 100 or more of the fine silver particles on the SEM image. As a result, the average primary particle diameter was 125 nm.

Then, the fine silver particles were caused to precipitate by the decantation of the water slurry containing the fine silver particles, and then, a supernatant was removed from the water slurry to recover wet fine silver particles.

Furthermore, in order to obtain the concentration of silver in the wet fine silver particles and to obtain the coating amount of octylamine serving as the organic protective material, the solvent other than silver and the organic protective material was volatilized at a temperature of 60° C. from about 1 g of the wet fine silver particles distributed, and then, the temperature was raised to 700° C. to burn the solvent-volatilized fine silver particles to completely dissolve the organic protective material. Assuming that the weight of the wet fine silver particles is M1, that the weight thereof after volatilizing the solvent is M2 and that the weight thereof after dissolving the organic protective material is M3, the concentration of silver=(M3/M1)×100 (% by weight) and the coating amount of octylamine=(1−M3/M2)×100. Thus, the concentration of silver was 80.9% by weight, and the coating amount of octylamine with respect to silver was 0.46% by weight.

Then, the recovered wet fine silver particles (coated with octylamine) 57.4 g (80.9% by weight of fine silver particles coated with 0.46% by weight of octylamine with respect to silver), together with a dispersing agent containing methacrylic acid butyl ester dissolved in diethylene glycol monobutyl ether (M1400 produced by Sekisui Chemical Co., Ltd., solid content 48.5%) 2.0 g serving as an acrylic dispersing agent containing solution, were added to diethylene glycol monobutyl ether (boiling point=230° C., solubility parameter (SP value)=9.5) 1.6 g serving as a polar solvent having a boiling point of 150 to 300° C. Thereafter, the fine silver particles and acrylic dispersing agent containing solution, which were added to the polar solvent, were dried at room temperature in an atmosphere of nitrogen for 24 hours to remove the moisture content therein to obtain a fine silver particle dispersing solution containing 92.8% by weight of the fine silver particles, 5.3% by weight of the polar solvent having the boiling point of 150 to 300° C., and 1.9% by weight of the acrylic dispersing agent containing solution (containing 2.0% by weight of the acrylic dispersing agent of methacrylic acid butyl ester being the solid content of M1400 with respect to the fine silver particles).

Then, the fine silver particle dispersing solution thus obtained was caused to pass through a three-roll mill to be kneaded and degassed to prepare a fine silver particle kneaded mixture. After this fine silver particle kneaded mixture was diluted 10,000 times with butyl carbitol to be dispersed for one minute by means of an ultrasonic disperser, the average secondary particle diameter ($D_{50}$) of the fine silver particles was measured by means of a dynamic light scattering particle size analyzer (Nanotrac Wave-EX150 produced by Nikkiso Co., Ltd.). As a result, the average secondary particle diameter ($D_{50}$) of the fine silver particles was 132.9 nm. Therefore, the ratio $D_{50}/D_{SEM}$ of the average secondary particle diameter ($D_{50}$) to average primary particle diameter ($D_{SEM}$) of the fine silver particles was 1.06, so that the dispersibility of the fine silver particles was excellent.

After the obtained fine silver particle dispersing solution was applied on a glass substrate so as to have a size of 10 mm square and a thickness of 30 μm by means of a metal mask, the applied fine silver particle dispersing solution was burned at 130° C. for 30 minutes by a hot-air dryer (DKM400 produced by Yamato Scientific Co., Ltd.) to sinter the fine silver particles to form a silver conductive film on the glass substrate. The specific resistance value of the silver conductive film was calculated from the surface resistance thereof, which was measured by a surface resistance measuring apparatus (SURFCOM 1500DX produced by Toyo Precision Parts MFG Co., Ltd.), and the thickness thereof which was obtained by a thickness measuring apparatus. As a result, the specific resistance value was 6.1 μΩ·cm.

Example 2

A fine silver particle dispersing solution containing 92.9% by weight of the fine silver particles, 5.4% by weight of the polar solvent having the boiling point of 150 to 300° C., and 1.7% by weight of the acrylic dispersing agent containing solution (containing 1.75% by weight of the acrylic dispersing agent of methacrylic acid butyl ester being the solid content of M1400 with respect to the fine silver particles) was obtained by the same method as that in Example 1, except that the amount of diethylene glycol monobutyl ether to be added as the polar solvent having the boiling point 150 to 300° C. was 1.8 g and that the amount of the acrylic dispersing agent containing solution to be added was 1.7 g.

From the fine silver particle dispersing solution thus obtained, a fine silver particle kneaded mixture was prepared by the same method as that in Example 1, and the average secondary particle diameter ($D_{50}$) of the fine silver particles was measured by the same method as that in Example 1. As a result, the average secondary particle diameter ($D_{50}$) of the fine silver particles was 152.8 nm. Therefore, the ratio $D_{50}/D_{SEM}$ of the average secondary particle diameter ($D_{50}$) to average primary particle diameter ($D_{SEM}$) of the fine silver particles was 1.22, so that the dispersibility of the fine silver particles was excellent.

The specific resistance value of a silver conductive film formed from the obtained fine silver particle dispersing solution by the same method as that in Example 1 was calculated by the same method as that in Example 1. As a result, the specific resistance value was 4.6 μΩ·cm.

Example 3

A fine silver particle dispersing solution containing 92.8% by weight of the fine silver particles, 5.8% by weight of the polar solvent having the boiling point of 150 to 300° C., and 1.4% by weight of the acrylic dispersing agent containing solution (containing 1.5% by weight of the acrylic dispersing agent of methacrylic acid butyl ester being the solid content of M1400 with respect to the fine silver particles) was obtained by the same method as that in Example 1, except that the amount of diethylene glycol monobutyl ether to be added as the polar solvent having the boiling point 150 to 300° C. was 2.1 g and that the amount of the acrylic dispersing agent containing solution to be added was 1.5 g.

From the fine silver particle dispersing solution thus obtained, a fine silver particle kneaded mixture was prepared by the same method as that in Example 1, and the average secondary particle diameter ($D_{50}$) of the fine silver particles was measured by the same method as that in Example 1. As a result, the average secondary particle diameter ($D_{50}$) of the fine silver particles was 132.9 nm. Therefore, the ratio $D_{50}/D_{SEM}$ of the average secondary particle diameter ($D_{50}$) to average primary particle diameter ($D_{SEM}$) of the fine silver particles was 1.06, so that the dispersibility of the fine silver particles was excellent.

The specific resistance value of a silver conductive film formed from the obtained fine silver particle dispersing solution by the same method as that in Example 1 was calculated by the same method as that in Example 1. As a result, the specific resistance value was 4.4 μΩ·cm.

Example 4

A fine silver particle dispersing solution containing 92.8% by weight of the fine silver particles, 6.2% by weight of the polar solvent having the boiling point of 150 to 300° C., and 1.0% by weight of the acrylic dispersing agent containing solution (containing 1.0% by weight of the acrylic dispersing agent of methacrylic acid butyl ester being the solid content of M1400 with respect to the fine silver particles) was obtained by the same method as that in Example 1, except that the amount of diethylene glycol monobutyl ether to be added as the polar solvent having the boiling point 150 to 300° C. was 2.6 g and that the amount of the acrylic dispersing agent containing solution to be added was 1.0 g.

From the fine silver particle dispersing solution thus obtained, a fine silver particle kneaded mixture was prepared by the same method as that in Example 1, and the average secondary particle diameter ($D_{50}$) of the fine silver particles was measured by the same method as that in Example 1. As a result, the average secondary particle diameter ($D_{50}$) of the fine silver particles was 133.4 nm. Therefore, the ratio $D_{50}/D_{SEM}$ of the average secondary particle diameter ($D_{50}$) to average primary particle diameter ($D_{SEM}$) of the fine silver particles was 1.07, so that the dispersibility of the fine silver particles was excellent.

The specific resistance value of a silver conductive film formed from the obtained fine silver particle dispersing solution by the same method as that in Example 1 was calculated by the same method as that in Example 1. As a result, the specific resistance value was 4.3 μΩ·cm.

Example 5

A fine silver particle dispersing solution containing 92.8% by weight of the fine silver particles, 6.7% by weight of the polar solvent having the boiling point of 150 to 300° C., and 0.5% by weight of the acrylic dispersing agent containing solution (containing 0.5% by weight of the acrylic dispersing agent of methacrylic acid butyl ester being the solid content of M1400 with respect to the fine silver particles)

was obtained by the same method as that in Example 1, except that the amount of diethylene glycol monobutyl ether to be added as the polar solvent having the boiling point 150 to 300° C. was 3.1 g and that the amount of the acrylic dispersing agent containing solution to be added was 0.5 g.

From the fine silver particle dispersing solution thus obtained, a fine silver particle kneaded mixture was prepared by the same method as that in Example 1, and the average secondary particle diameter ($D_{50}$) of the fine silver particles was measured by the same method as that in Example 1. As a result, the average secondary particle diameter ($D_{50}$) of the fine silver particles was 133.1 nm. Therefore, the ratio $D_{50}/D_{SEM}$ of the average secondary particle diameter ($D_{50}$) to average primary particle diameter ($D_{SEM}$) of the fine silver particles was 1.06, so that the dispersibility of the fine silver particles was excellent.

The specific resistance value of a silver conductive film formed from the obtained fine silver particle dispersing solution by the same method as that in Example 1 was calculated by the same method as that in Example 1. As a result, the specific resistance value was 3.6 μΩ·cm.

Example 6

A fine silver particle dispersing solution containing 92.9% by weight of the fine silver particles, 6.9% by weight of the polar solvent having the boiling point of 150 to 300° C., and 0.2% by weight of the acrylic dispersing agent containing solution (containing 0.25% by weight of the acrylic dispersing agent of methacrylic acid butyl ester being the solid content of M1400 with respect to the fine silver particles) was obtained by the same method as that in Example 1, except that the amount of diethylene glycol monobutyl ether to be added as the polar solvent having the boiling point 150 to 300° C. was 3.3 g and that the amount of the acrylic dispersing agent containing solution to be added was 0.2 g.

From the fine silver particle dispersing solution thus obtained, a fine silver particle kneaded mixture was prepared by the same method as that in Example 1, and the average secondary particle diameter ($D_{50}$) of the fine silver particles was measured by the same method as that in Example 1. As a result, the average secondary particle diameter ($D_{50}$) of the fine silver particles was 151.1 nm. Therefore, the ratio $D_{50}/D_{SEM}$ of the average secondary particle diameter ($D_{50}$) to average primary particle diameter ($D_{SEM}$) of the fine silver particles was 1.21, so that the dispersibility of the fine silver particles was excellent.

The specific resistance value of a silver conductive film formed from the obtained fine silver particle dispersing solution by the same method as that in Example 1 was calculated by the same method as that in Example 1. As a result, the specific resistance value was 3.9 μΩ·cm.

Example 7

A water slurry of fine silver particles was obtained by the same method as that in Example 1, except that nitric acid (concentration 60%) 2.0 g was added thereto to adjust the pH after octylamine was added thereto. The average primary particle diameter ($D_{SEM}$) of the fine silver particles in the water slurry was calculated by the same method as that in Example 1. At a result, the average primary particle diameter was 188 nm.

Then, wet fine silver particles were recovered from the obtained water slurry of the fine silver particles by the same method as that in Example 1. The concentration of silver and the coating amount of octylamine with respect to silver were obtained by the same methods as those in Example 1. As a result, the concentration of silver was 86.3% by weight, and the coating amount of octylamine with respect to silver was 0.31% by weight.

Then, a fine silver particle dispersing solution containing 92.8% by weight of the fine silver particles, 6.7% by weight of the polar solvent having the boiling point of 150 to 300° C., and 0.5% by weight of the acrylic dispersing agent containing solution (containing 0.5% by weight of the acrylic dispersing agent of methacrylic acid butyl ester being the solid content of M1400 with respect to the fine silver particles) was obtained by the same method as that in Example 5, except that the recovered wet fine silver particles (coated with octylamine) 53.8 g (86.3% by weight of fine silver particles coated with 0.31% by weight of octylamine with respect to silver) were used.

From the fine silver particle dispersing solution thus obtained, a fine silver particle kneaded mixture was prepared by the same method as that in Example 1, and the average secondary particle diameter ($D_{50}$) of the fine silver particles was measured by the same method as that in Example 1. As a result, the average secondary particle diameter ($D_{50}$) of the fine silver particles was 224.0 nm. Therefore, the ratio $D_{50}/D_{SEM}$ of the average secondary particle diameter ($D_{50}$) to average primary particle diameter ($D_{SEM}$) of the fine silver particles was 1.19, so that the dispersibility of the fine silver particles was excellent.

The specific resistance value of a silver conductive film formed from the obtained fine silver particle dispersing solution by the same method as that in Example 1 was calculated by the same method as that in Example 1. As a result, the specific resistance value was 5.6 μΩ·cm.

Comparative Example 1

After pure water 3422.0 g serving as a reaction medium was put in a 5 L of reaction vessel to adjust the temperature thereof at 40° C., octylamine (special grade produced by Wako Pure Chemical Industries, Ltd., molecular weight 129.24, carbon number=8) 63.9 g serving as an organic protective material (the molar ratio of the organic protective material to Ag (number of moles of octylamine/number of moles of silver)=2.5), and hydrazine hydrate (80% solution produced by Otsuka Chemical Co., Ltd.) 6.2 g serving as a reducing agent (the molar ratio of the reducing agent to Ag (number of moles of hydrazine hydrate/number of moles of silver)=0.5) were added thereto. The solution thus obtained was stirred by rotating a stirring rod having impellers at 345 rpm by means of an outside motor while blowing nitrogen gas serving as an inert gas into the solution at a flow rate of 2 L/min. Then, after an aqueous solution prepared by dissolving silver nitrate crystal (produced by Toyo Kagaku Inc.) 33.6 g serving as a silver compound in pure water 180.0 g was added thereto at a stroke, the solution was stirred for 2 minutes to obtain a water slurry containing fine silver particles coated with octylamine serving as the organic protective material.

The fine silver particles in the water slurry thus obtained were observed at a magnification of 50,000 by means of a scanning electron microscope (SEM) (S-4700 produced by Hitachi Hi-Technologies Corporation), and the average primary particle diameter ($D_{SEM}$) of the fine silver particles was calculated by the image analysis software (A-image-kun (registered trademark) produced by Asahi Kasei Engineering Corporation) with respect to optionally selected 100 or more of the fine silver particles on the SEM image. As a result, the average primary particle diameter ($D_{SEM}$) was 35.6 nm.

Then, after the fine silver particles were caused to precipitate by the decantation of the water slurry containing the fine silver particles, a supernatant was removed from the water slurry to recover wet fine silver particles. Furthermore, the concentration of silver in the wet fine silver particles, and the coating amount of octylamine serving as the organic protective material were obtained by the same methods as those in Example 1. As a result, the concentration of silver was 66.0% by weight, and the coating amount of octylamine with respect to silver was 1.5% by weight.

Then, the recovered wet fine silver particles (coated with octylamine) 64.4 g (66.0% by weight of fine silver particles coated with 1.5% by weight of octylamine with respect to silver), together with a dispersing agent containing methacrylic acid butyl ester dissolved in diethylene glycol monobutyl ether (M1400 produced by Sekisui Chemical Co., Ltd., solid content 48.5%) 1.4 g serving as an acrylic dispersing agent containing solution, were added to diethylene glycol monobutyl ether (boiling point=230° C., solubility parameter (SP value)=9.5) 5.5 g serving as a polar solvent having a boiling point of 150 to 300° C. Thereafter, the fine silver particles and acrylic dispersing agent containing solution, which were added to the polar solvent, were dried at room temperature in an atmosphere of nitrogen for 24 hours to remove the moisture content therein to obtain a fine silver particle dispersing solution containing 86.2% by weight of the fine silver particles, 12.4% by weight of the polar solvent having the boiling point of 150 to 300° C., and 1.4% by weight of the acrylic dispersing agent containing solution (containing 1.5% by weight of the acrylic dispersing agent of methacrylic acid butyl ester being the solid content of M1400 with respect to the fine silver particles).

From the fine silver particle dispersing solution thus obtained, a fine silver particle kneaded mixture was prepared by the same method as that in Example 1, and the average secondary particle diameter ($D_{50}$) of the fine silver particles was measured by the same method as that in Example 1. As a result, the average secondary particle diameter ($D_{50}$) of the fine silver particles was 63.4 nm. Therefore, the ratio $D_{50}/D_{SEM}$ of the average secondary particle diameter ($D_{50}$) to average primary particle diameter ($D_{SEM}$) of the fine silver particles was 1.78, so that the dispersibility of the fine silver particles was bad to cause the fine silver particle to be aggregated.

The specific resistance value of a silver conductive film formed from the obtained fine silver particle dispersing solution by the same method as that in Example 1 was calculated by the same method as that in Example 1. As a result, the specific resistance value was 5.6 µΩ·cm.

Comparative Example 2

A fine silver particle dispersing solution containing 86.2% by weight of the fine silver particles, 13.0% by weight of the polar solvent having the boiling point of 150 to 300° C., and 0.8% by weight of the acrylic dispersing agent containing solution (containing 0.9% by weight of the acrylic dispersing agent of methacrylic acid butyl ester being the solid content of M1400 with respect to the fine silver particles) was obtained by the same method as that in Comparative Example 1, except that the amount of diethylene glycol monobutyl ether to be added as the polar solvent having the boiling point 150 to 300° C. was 6.0 g and that the amount of the acrylic dispersing agent containing solution to be added was 0.9 g.

From the fine silver particle dispersing solution thus obtained, a fine silver particle kneaded mixture was prepared by the same method as that in Example 1, and the average secondary particle diameter ($D_{50}$) of the fine silver particles was measured by the same method as that in Example 1. As a result, the average secondary particle diameter ($D_{50}$) of the fine silver particles was 123.8 nm. Therefore, the ratio $D_{50}/D_{SEM}$ of the average secondary particle diameter ($D_{50}$) to average primary particle diameter ($D_{SEM}$) of the fine silver particles was 3.48, so that the dispersibility of the fine silver particles was bad to cause the fine silver particle to be aggregated.

The specific resistance value of a silver conductive film formed from the obtained fine silver particle dispersing solution by the same method as that in Example 1 was calculated by the same method as that in Example 1. As a result, the specific resistance value was 4.9 µΩ·cm.

Comparative Example 3

After pure water 3691.7 g serving as a reaction medium was put in a 5 L of reaction vessel to adjust the temperature thereof at 60° C., silver nitrate crystal (produced by Toyo Kagaku Inc.) 34.3 g serving as a silver compound, pure water 100.0 g and copper nitrate trihydrate 0.0083 g were added thereto. The solution thus obtained was stirred by rotating a stirring rod having impellers at 475 rpm by means of an outside motor in an atmosphere of nitrogen. Then, 25% by weight of ammonia water (industrial ammonia water produced by Takasugi Pharmaceutical Co., Ltd.) 49.1 g was added thereto. After three minutes, polyethylene imine (produced by Wako Pure Chemical Industries, Ltd., weight-average molecular weight=600) 0.55 g was added thereto. After 10 minutes, hydrazine hydrate (80% solution produced by Otsuka Chemical Co., Ltd.) 4.74 g serving as a reducing agent (the molar ratio of the reducing agent to Ag (number of moles of hydrazine hydrate/number of moles of silver)= 0.375) was added thereto at a stroke. After the solution was stirred for 10 minutes, octylamine (special grade produced by Wako Pure Chemical Industries, Ltd., molecular weight=129.24, carbon number=8) 6.5 g serving as an organic protective material (the molar ratio of the organic protective material to Ag (number of moles of octylamine/ number of moles of silver)=0.25) was added thereto to obtain a water slurry containing fine silver particles coated with octylamine. The average primary particle diameter of the fine silver particles ($D_{SEM}$) in this water slurry was calculated by the same method as that in Example 1. As a result, the average primary particle diameter ($D_{SEM}$) was 459 nm.

Then, wet fine silver particles were recovered from the obtained water slurry of fine silver particles by the same method as that in Example 1, and the concentration of silver and the coating amount of octylamine with respect to silver were obtained by the same methods as those in Example 1. As a result, the concentration of silver was 65.4% by weight, and the coating amount of octylamine with respect to silver was 0.38% by weight.

Then, a fine silver particle dispersing solution containing 92.9% by weight of the fine silver particles, 6.7% by weight of the polar solvent having the boiling point of 150 to 300° C., and 0.5% by weight of the acrylic dispersing agent containing solution (containing 0.5% by weight of the acrylic dispersing agent of methacrylic acid butyl ester being the solid content of M1400 with respect to the fine silver particles) was obtained by the same method as that in Example 5, except that the recovered wet fine silver particles (coated with octylamine) 72.5 g (65.4% by weight of fine silver particles coated with 0.38% by weight of octylamine with respect to silver) were used.

From the fine silver particle dispersing solution thus obtained, a fine silver particle kneaded mixture was prepared by the same method as that in Example 1, and the average secondary particle diameter ($D_{50}$) of the fine silver particles was measured by the same method as that in Example 1. As a result, the average secondary particle diameter ($D_{50}$) of the fine silver particles was 1225 nm. Therefore, the ratio $D_{50}/D_{SEM}$ of the average secondary particle diameter ($D_{50}$) to average primary particle diameter ($D_{SEM}$) of the fine silver particles was 2.67, so that the dispersibility of the fine silver particles was bad to cause the fine silver particle to be aggregated.

The specific resistance value of a silver conductive film formed from the obtained fine silver particle dispersing solution by the same method as that in Example 1 was calculated by the same method as that in Example 1. As a result, the specific resistance value was a high value of 23.8 μΩ·cm.

The results in these examples and comparative examples are shown in Tables 1-2.

TABLE 1

|  | Content of Silver (wt %) | Solvent (wt %) | Dispersing Agent (wt %) |
|---|---|---|---|
| Ex. 1 | 92.8 | 5.3 | 1.9 |
| Ex. 2 | 92.9 | 5.4 | 1.7 |
| Ex. 3 | 92.8 | 5.8 | 1.4 |
| Ex. 4 | 92.8 | 6.2 | 1.0 |
| Ex. 5 | 92.8 | 6.7 | 0.5 |
| Ex. 6 | 92.9 | 6.9 | 0.2 |
| Ex. 7 | 92.8 | 6.7 | 0.5 |
| Comp. 1 | 86.2 | 12.4 | 1.4 |
| Comp. 2 | 86.2 | 13.0 | 0.8 |
| Comp. 3 | 92.9 | 6.6 | 0.5 |

TABLE 2

|  | $D_{SEM}$ (nm) | $D_{50}$ (nm) | $D_{50}/D_{SEM}$ | Specific Resistance Value (μΩ · cm) |
|---|---|---|---|---|
| Ex. 1 | 125 | 132.9 | 1.06 | 6.1 |
| Ex. 2 | 125 | 152.8 | 1.22 | 4.6 |
| Ex. 3 | 125 | 132.9 | 1.06 | 4.4 |
| Ex. 4 | 125 | 133.4 | 1.07 | 4.3 |
| Ex. 5 | 125 | 133.1 | 1.06 | 3.6 |
| Ex. 6 | 125 | 151.1 | 1.21 | 3.9 |
| Ex. 7 | 188 | 224.0 | 1.19 | 5.6 |
| Comp. 1 | 35.6 | 63.4 | 1.78 | 5.6 |
| Comp. 2 | 35.6 | 123.8 | 3.48 | 4.9 |
| Comp. 3 | 459 | 1225 | 2.67 | 23.8 |

The invention claimed is:

1. A fine silver particle dispersing solution consisting of:
    a glycol ether solvent having a boiling point of 150 to 300° C.;
    fine silver particles which are coated with an amine having a carbon number of 8 to 12 as an organic protective material and which have an average primary particle diameter of greater than 100 nm and not greater than 300 nm; and
    a dispersing agent having a framework of methacrylic acid butyl ester expressed by the following chemical formula [I]

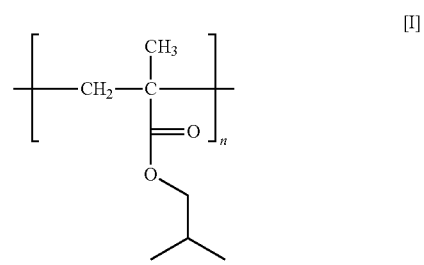

wherein n is a natural number, the molecular weight of the dispersing agent is not greater than 40,000, and the amount of the dispersing agent being in the range from 0.1% by weight to 5% by weight with respect to that of fine silver particles.

2. A fine silver particle dispersing solution as set forth in claim 1, wherein said amine is octylamine.

3. A fine silver particle dispersing solution as set forth in claim 1, wherein said glycol ether solvent is diethylene glycol monobutyl ether, diethylene glycol dibutyl ether or diethylene glycol monobutyl ether acetate.

4. A fine silver particle dispersing solution as set forth in claim 1, wherein the content of silver in said fine silver particle dispersing solution is 30 to 95% by weight.

5. A fine silver particle dispersing solution as set forth in claim 1, wherein the content of said glycol ether solvent in said fine silver particle dispersing solution is 5 to 70% by weight.

6. A fine silver particle dispersing solution as set forth in claim 1, wherein the amount of the dispersing agent is in the range of from 0.1% by weight to 3.0% by weight with respect to that of the fine silver particles.

7. A fine silver particle dispersing solution as set forth in claim 1, wherein the amount of the dispersing agent is in the range of from 0.2% by weight to 2.5% by weight with respect to that of the fine silver particles.

8. A fine silver particle dispersing solution as set forth in claim 1, wherein the average primary particle diameter of said fine silver particles is not greater than 150 nm and wherein the amount of said dispersing agent is in the range of from 0.5% by weight to 1.5% by weight with respect to that of the fine silver particles.

* * * * *